Sept. 21, 1943.  R. W. SPEISER  2,329,952
LAWN MOWER
Filed April 28, 1941  3 Sheets-Sheet 1
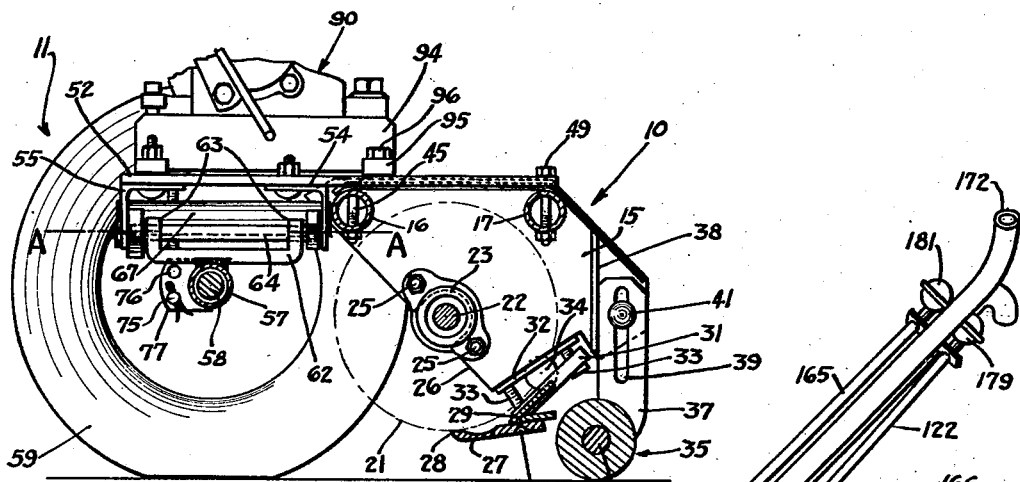
Fig. 2
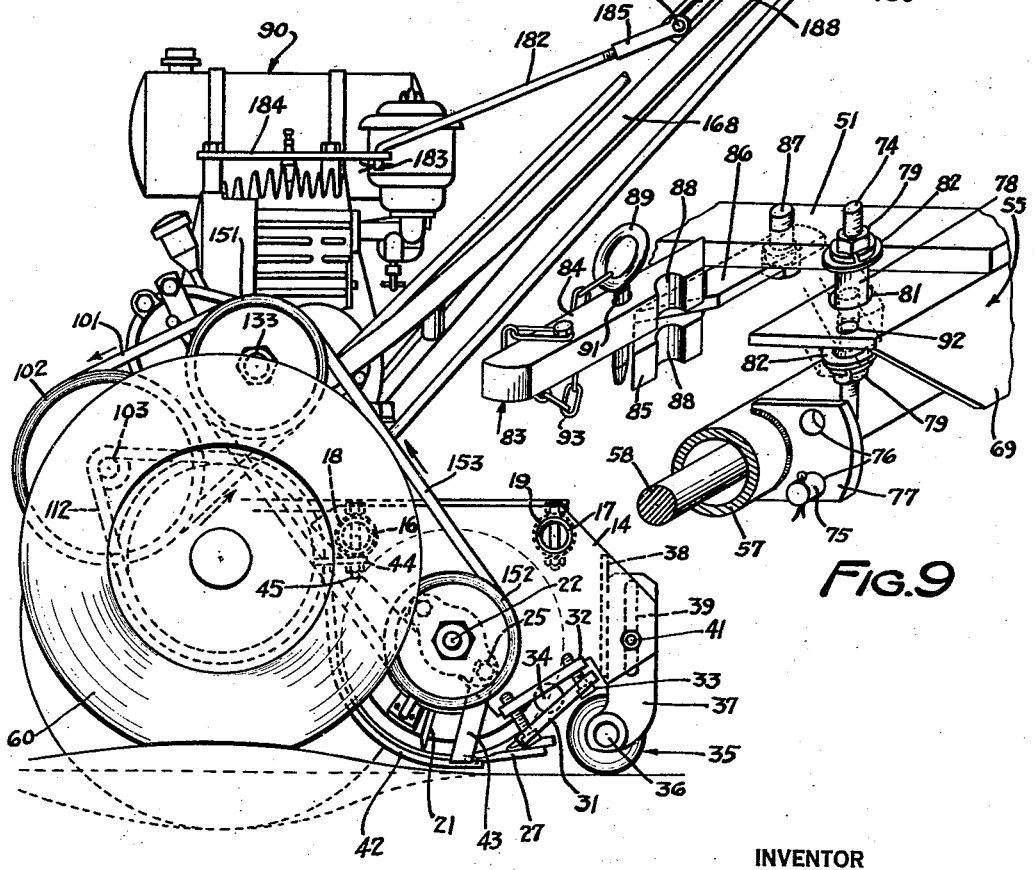
Fig. 1
Fig. 9
INVENTOR
RALPH W. SPEISER
BY
ATTORNEYS Sept. 21, 1943.　　　　R. W. SPEISER　　　　2,329,952
LAWN MOWER
Filed April 28, 1941　　　　3 Sheets-Sheet 2

INVENTOR
RALPH W. SPEISER
BY
ATTORNEYS

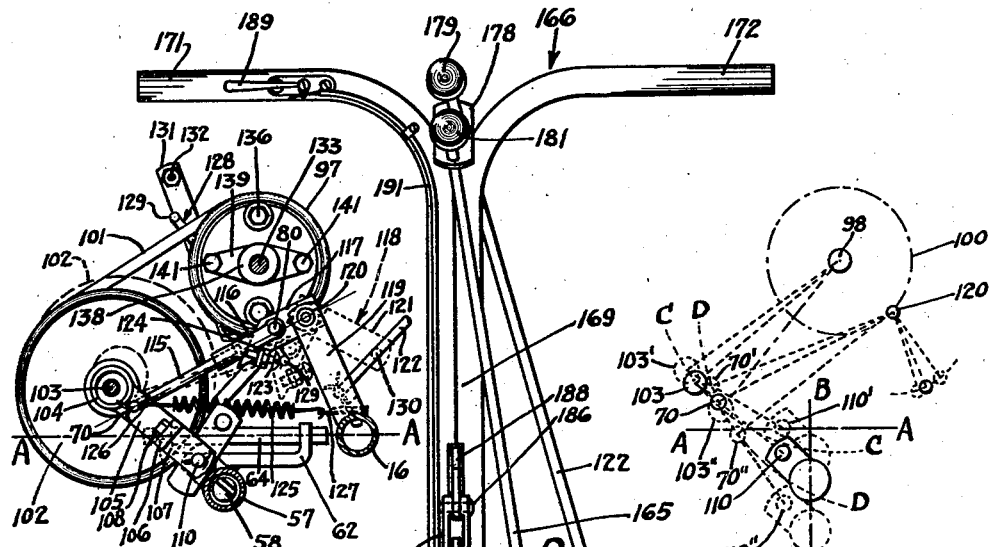
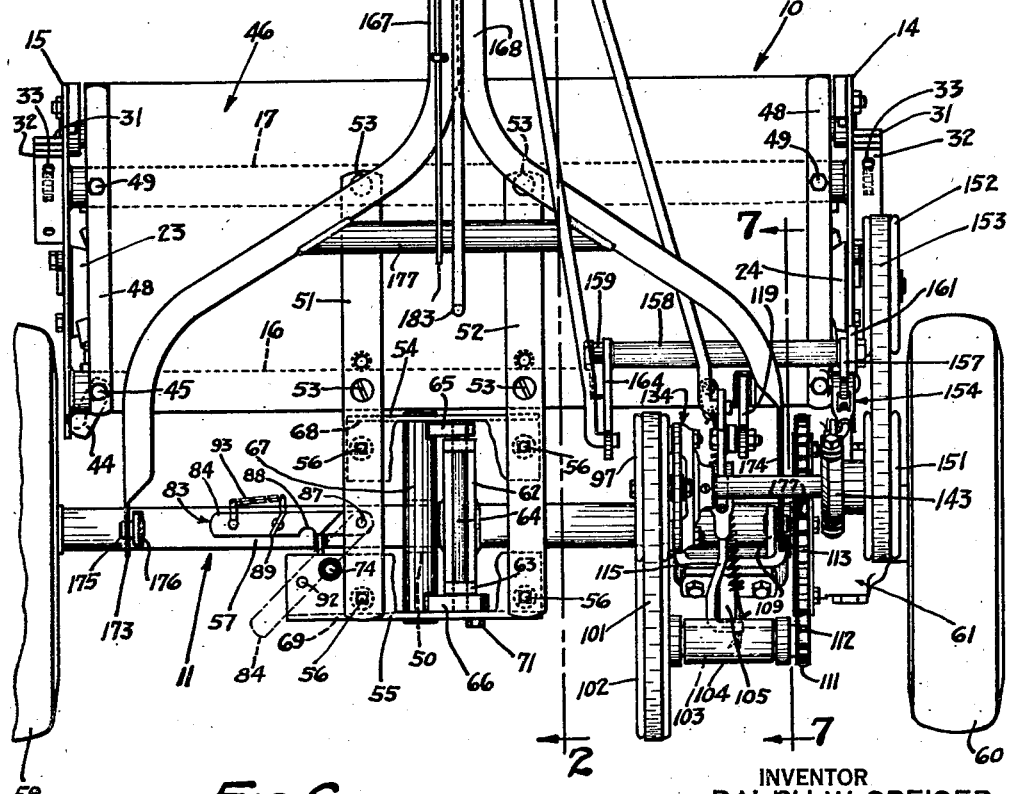

Patented Sept. 21, 1943

2,329,952

UNITED STATES PATENT OFFICE 2,329,952

LAWN MOWER

Ralph W. Speiser, Minneapolis, Minn., assignor to Toro Manufacturing Corporation of Minnesota, Minneapolis, Minn., a corporation of Minnesota Application April 28, 1941, Serial No. 390,789

9 Claims. (Cl. 56—26)

This invention relates to new and useful improvements in lawn mowers and more particularly to a power mower of the character commonly known as a walk-type mower.

An important object of the invention resides in the provision of a mower which is highly efficient in operation, is sturdy and rugged in construction, and comparatively light in weight, whereby it may be conveniently operated with a minimum of effort.

A further object of the invention is to provide a lawn mower comprising a traction unit and a mowing unit coupled together by a pivotal connection whereby the traction and cutting units are adapted for independent rocking movement in a direction transverse to the traveling movement of the mower, whereby the traction wheels and cutting unit may freely follow the contour of the ground.

A further object is to provide a mower of the character disclosed comprising a power unit having suitable traction wheels, and a cutting unit having a pivotal connection with the power unit and carrying a motor having a flexible drive for imparting power to the traction wheels, and a flexible drive for driving the reel of the cutting unit, said flexible drives being so arranged that the power and cutting units are free to rock transversely with respect to each other, whereby said units may follow the contour of the ground independently of each other, without affecting the operation of said flexible drives.

A further object is to provide a power operated lawn mower comprising a power unit and a mowing or cutting unit, and the connection between the power and mowing units being such that the power unit may be said to float or oscillate with respect to the mowing unit, whereby the traction wheels thereof may follow the contour of the ground without imparting lateral tilting movements to the cutting units, and the connection between the power and cutting units also being such that the power unit may be locked against lateral tilting movement with respect to the mowing unit, when so desired.

A further object is to provide a power operated mower of the class described, comprising a power unit having a mowing unit operatively connected thereto and provided with a forwardly extending frame adapted to support a motor, whereby the major portion of the weight of the motor will be carried by the traction wheels of the traction unit, and the motor having independent flexible driving connections with the traction wheels of the power unit and the cutting reel of the mowing unit, and means being provided for independently controlling the operations of said flexible drives, and the motor being so arranged on the apparatus as to properly balance the weight thereof on the supporting roller of the mowing unit and the traction wheels of the power unit, whereby the mower may be operated with a minimum of effort.

Other objects reside in the specific construction of the means for coupling the mowing unit to the traction unit, which provides in effect, a universal connection; in the means provided for vertically adjusting the cutting reel with respect to the ground, and whereby the position of the bed knife of the mowing unit may be properly maintained with respect to the ground, regardless of the vertical adjustment of the bed knife relative to the ground surface; in the simple means provided for locking the traction wheel axle housing against transverse rocking movement with respect to the mowing unit; in the unique arrangement of the linkage mechanism for controlling the operations of the flexible drives, whereby wear to the operating parts of said drives is reduced to a minimum; in the simple and inexpensive construction of the entire apparatus, whereby it may be manufactured at a minimum cost; and, in the novel construction and arrangement of the flexible drives, whereby if desired, the motor may be removed from the apparatus and the mower operated as a hand-powered mower, the reel being driven from the traction wheels through said flexible drives.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 1 is a side elevation of my improved walk-type power mower;

Figure 2 is a sectional view on the line 2—2 of Figure 6, with some of the parts omitted, showing the universal connection between the traction and cutting units;

Figure 3 is a front elevation of Figure 1, with the guiding handle removed, and showing the traction unit disposed at an angle to the cutting unit;

Figure 4 is a detail sectional view on the line 4—4 of Figure 3, showing the drive for the reel and the means for controlling the operation thereof;

Figure 5 is a view substantially on the line 5—5 of Figure 4;

Figure 6 is a plan view of Figure 1, with the motor removed;

Figure 7 is a detail sectional view on the line 7—7 of Figure 6, showing the drive for the traction unit and the means for controlling the operation thereof;

Figure 8 is a diagrammatic view of the parts shown in Figure 7, illustrating the movements of such parts; and Figure 9 is an isometric view showing the means for locking the traction unit against transverse rocking movement with respect to the cutting unit.

The novel walk type power mower herein disclosed is shown comprising a mower unit and a traction unit, generally designated by the numerals 10 and 11, respectively, which are pivotally connected together to provide a unitary structure, and whereby the traction and cutting units are adapted for transverse rocking movement independently of one another in a direction transverse to the line of travel of the apparatus, whereby said units may follow the contour of the ground when the apparatus is in operation.

*Cutting unit*

The cutting unit 10 is somewhat similar in construction to the one shown and described in my co-pending application, Serial No. 355,171, filed September 3, 1940, and therefore need not be described in detail in the present application. A cutting unit of this type is dependent upon other means to maintain the spaced relation between its cutting means and the ground, and in the present application, such a supporting means is provided by the traction unit 11, to which the forward portion of the cutting unit 10 is connected, as will subsequently be described.

The cutting unit comprises a welded frame structure including end plates 14 and 15 secured together in spaced relation by tubular cross members 16 and 17. The ends of the members 16 and 17 are preferably provided with annular shoulders, not shown in the drawings, and said shouldered ends are received in openings 18 and 19 provided in the end plates, as shown in Figure 1. The ends of the members 16 and 17 are welded to the end plates 14 and 15, whereby a very sturdy, light weight frame structure is provided for supporting the cutting means.

The cutting means is shown comprising a reel 21 having a shaft 22 mounted for rotation in suitable bearings 23 and 24, detachably secured to the end plates 14 and 15, respectively, by suitable bolts 25, whereby the reel 21 with its shaft and the bearings 23 and 24, may be removed as a unit from the cutting unit frame by removal of the bolts 25, it being understood that the bearing housings 23 and 24 are received in notches cut in the forwardly directed edges 26 of the end plates 14 and 15.

The reel 21 is mounted in operative relation to a bed knife 27 having its forwardly directed cutting edge 28 arranged in cutting relation to the periphery of the reel, as clearly illustrated in Figure 2. The bed knife 27 is shown secured to a supporting bar 29 by suitable screws 30 spaced apart lengthwise of the supporting bar. The supporting bar 29 is preferably V-shaped in cross section, as shown in Figure 2, and is provided at its ends with suitable lugs 31 adapted to be secured to inwardly turned flanges or lugs 32 provided on the end plates 14 and 15, by means of suitable screws or bolts 33. Disk-like elements 34 are interposed between the lugs 31 and 32, and are received in cylindrical recesses provided in the adjacent surfaces of the lugs 31 and 32, whereby the lugs 31 and 32 are normally spaced apart, as shown in Figure 1. The disk-like elements 34 provide, in effect, fulcrums about which the supporting bar 29 may be rotated to adjust the cutting edge 28 of the bed plate 27 with respect to the periphery of the reel 21. Such adjustment of the bed knife may be conveniently accomplished by manipulation of the screws 33. The disks 34, in addition to providing fulcrums for the supporting bar 29, also serve to prevent endwise movement of the supporting bar with respect to the end plates 14 and 15.

The rear portion of the cutting unit 10 is supported by a suitable ground engaging member, generally designated by the numeral 35, which may be composed of a plurality of relatively short roller sections axially alined on a shaft or axle 36, having its end portions supported in suitable brackets 37. The brackets 37 are adjustably secured in vertical guides 38 provided in the rear portions of the side plates 14 and 15 of the cutting unit frame, as best shown in Figures 1 and 2. Each bracket 37 has a slot 39 adapted to receive bolts 41 provided in the end plates and whereby the brackets 37 may be secured to their respective end plates, as will readily be understood by reference to Figures 1 and 2. The adjustability of the brackets 37 in the end plates 14 and 15 permits the reel and bed knife to be vertically adjusted with respect to the ground. The supporting roller 35 is made sectional to facilitate turning movement of the mower.

A suitable guard 42 is provided at each end of the reel 21 to prevent the ends of the reel from impinging against stones or digging into the turf. The rear ends of the guards 42 are supported by brackets 43 having their lower ends welded to their respective guards and each having its upper end engaged with one of the bolts 25 securing the reel bearings 23 and 24 to the end plates. The upper ends of the reel guards 42 are shown provided with rearwardly extending brackets or lugs 44 adapted to be secured to the front tubular cross member 16 of the mower unit frame by suitable bolts 45, as will be seen by reference to Figure 1.

A suitable grass shield, generally designated by the numeral 46, is provided for enclosing the upper portion of the reel 21, and is shown having its forward marginal edge portion secured to the cross member 16 by the bolt 45. Suitable reinforcing bars 48 are provided at the ends of the shield 46, as shown in Figure 6, and have their forward ends secured in position by the bolts 45, which pass through alined apertures in the reinforcing bars 48, shield 46, tubular member 16 and lugs 44 of the reel guards 42, whereby all of said parts are suitably secured together by said bolts. Similar bolts 49 secure the shield to the rear tubular cross member 17, as shown in Figures 2 and 6.

A pair of spaced parallel bars 51 and 52 are secured to the cross members 16 and 17 of the cutting unit 10 by suitable bolts 53, and extend forwardly of the cross member 16 and have oppositely disposed depending angle brackets 54 and 55 secured thereto by such means as bolts 56. The bars 51 and 52, as clearly illustrated in Figure 6, are disposed on top of the shield 46, whereby they also reinforce or strengthen the shield, as will readily be understood.

Traction unit

The traction unit, as best shown in Figures 1, 2, 3, and 6, comprises an axle housing 57 having an axle 58 mounted therein. A traction wheel 59 is secured to one end of the axle 58, and the other end of the axle is connected to a suitable differential, generally designated by the numeral 61. The differential is operatively secured to a traction wheel 60.

An important feature of the present invention resides in the novel construction of the means for pivotally coupling or connecting the forward end of the cutting unit 10 to the traction unit 11, whereby said units are free to rock transversely to the direction of travel, independently of one another. To thus connect the cutting unit to the traction unit, a U-shaped bar 62 is shown suitably secured to the axle housing 57 by such means as welding. A rod 64 is journaled in the upwardly turned ends 63 of the bar 62 and forms the pivot axis about which the traction unit 11 swings or rocks transversely of the cutting unit 10. A member 67 has its end portions journaled in the depending legs or flanges 68 and 69 of the angle brackets 54 and 55, respectively, as shown in Figure 6. Laterally extending lugs 65 and 66 are secured to the member 67 and have bearing apertures therein for receiving the rod 64. The lugs 65 and 66 are so spaced apart on the member 67 as to fit between the legs 68 and 69 of the angle brackets 54 and 55, whereby said legs prevent endwise movement of the member 67. Endwise movement of the rod 64 is also prevented by the legs 68 and 69, as the rod 64 is normally positioned above the lower edges of the legs 68 and 69, as clearly shown in Figure 3. The member 67 and rod 64 may be removed by detaching the front angle bracket 55 from the bars 51 and 52. A portion of the under side of the member 67 may be cut away over the axle housing 57, as indicated at 50 in Figure 3, to provide adequate clearance for the relative rocking movement of the axle housing.

By connecting the forward end of the cutting unit 10 to the axle housing 57 of the traction unit 11, as above described, it will be noted that the housing 57 is free to rock about the axis of the pin or rod 64, which is disposed in a direction parallel to the line of travel of the apparatus. The member 67 is locked against rotation by means of a screw 71 received in one of two apertures 72 or 73 provided in the depending leg 69 of the front angle bracket 55. The screw 71 is received in threaded engagement with the lug or arm 66 of the member 67. By the provision of the vertically spaced apertures 72 and 73, it will be noted that the forward end of the cutting unit is vertically adjustable on the traction unit 11 by shifting the screw or bolt 71 from one hole to the other. In other words, in the structure as shown in Figure 3, the forward end of the cutting unit is shown supported on the axle housing 57 in its lowest position. By removing the screw 71 from the upper aperture 72 and elevating the forward end of the cutting unit until the aperture 73 is alined with the threaded aperture in the lug or arm 66, and then inserting the screw in the aperture 73, the forward end of the cutting unit may be vertically adjusted on the axle housing 57, as will be readily understood.

As hereinbefore stated, the roller 35 is vertically adjustable on the frame of the cutting unit to raise or lower the rear end of said frame about the axis of the axle 58. Thus, by the cooperative use of the front and rear vertical adjustments, above referred to, it is possible to raise the cutting reel 21 and bed knife 27 a considerable distance above the ground, and yet maintain the top of the cutting unit substantially horizontal throughout the range of such vertical adjustment. This is a highly desirable feature inasmuch as the power unit, subsequently to be described, is carried by the forward end of the cutting unit.

Means is provided for limiting the rocking movement of the axle housing with respect to the cutting unit. Such means is best shown in Figure 9 and comprises an L-shaped bolt or rod 74 having a lower right angle portion 75 received in one of a pair of vertically spaced apertures 76 provided in a forwardly extending lug 77, shown welded to the axle housing 57, as best illustrated in Figure 9. The upper end portion of the rod 74 is threaded, and a short tubular member 78 is mounted thereon and secured in position by clamping nuts 79. The tubular member 78 is movably received in an aperture 81 provided in the horizontal web of the angle bracket 55. Suitable abutment washers 82 are seated against the ends of the tubular member 78 and limit longitudinal movement of the tubular member 78 in the aperture 81, thereby to limit the transverse rocking or oscillatory movement of the axle housing 57 with respect to the cutting unit 10.

In some instances, it may be found desirable to lock the axle housing 57 against such transverse rocking movement. Means is therefore provided for thus locking the housing 57 against relative rocking movement, and is shown comprising a lock lever, generally designated by the numeral 83. This lever is shown comprising upper and lower members 84 and 85, respectively, secured to an arm 86 having one end pivoted to the forwardly extending bar 51 of the cutting unit frame by a suitable pivot bolt 87, as shown in Figures 6 and 9. The arm 86 is disposed in the plane of the upper web of the angle bracket 55, and is of substantially the same thickness, whereby when the arm 83 is swung into operative relation with the rod 74, as indicated in dotted lines in Figure 6, the horizontal web of the angle bracket 55 will be received between the members 84 and 85 of the lever 83, as will readily be understood by reference to Figure 9. The members 84 and 85 are provided with alined semi-cylindrical recesses 88 adapted to receive the tubular member 78 secured to the rod 74. The members 84 and 85 are of such size that when moved into position in engagement with the tubular member 78, they will substantially fill the gaps between the upper and lower faces of the horizontal web of the angle bracket 55 and the washers 82, thereby preventing relative vertical movement of the rod 74 in the upper horizontal web of the angle bracket 55. A lock pin 89 is provided for securing the lever 83 in operative position with the angle bracket 55. This pin is adapted to be inserted through alined apertures 91 and 92 provided respectively in the arm 83 and horizontal web of the angle bracket 55. The lock pin is preferably inseparably secured to the arm 83 by such means as a chain 93. When the lock lever 83 is swung into operative engagement with the angle bracket 55, as above stated, the axle housing 57 will be locked against relative rocking movement, whereby the cutting and traction units become fixed with respect to one another.

Power unit or motor

The mower, as shown in Figure 1, is propelled by a suitable motor 90, shown mounted on the forwardly extending bars 51 and 52 of the cutting unit frame, as clearly illustrated in Figures 2 and 3. The motor 90 may be a conventional one or two cylinder air cooled gasoline engine, comprising a base 94 shown having laterally extending lugs 95 seated on the bars 51 and 52 and suitably secured thereto by bolts 96. By reference to Figures 1 and 2, it will be noted that the motor 90 is located slightly rearwardly of the axle housing 57 in such a manner that the major portion of its weight is carried by the traction wheels 59 and 60, sufficient weight, however, being carried on the trailing roller 35 to hold said roller in firm contact with the ground in the operation of the mower. It will also be noted by reference to Figures 3 and 6, that the motor 90 is shown mounted slightly to the right of the longitudinal centerline of the mower, whereby its weight will counterbalance the weight of the traction wheel and reel driving mechanisms which, it will be noted, are located at the left hand side of the mower. In other words, the motor is so located with respect to the driving mechanisms that the combined weights of the motor and driving mechanisms will be substantially uniformly distributed on the two traction wheels, it being understood that a portion of such weight may be transmitted to the trailing roller 35. The motor 90 may be readily removed from the mower as a unit by simply removing the screws or bolts 96 and disconnecting it from the driving mechanism, subsequently to be described.

Traction wheel drive

The means for driving the traction wheels is shown comprising a drive pulley 97 secured to the power out-put shaft 98 of a suitable speed reducer, generally indicated by the numeral 99. The speed reducer is connected to the usual crank shaft of the motor in the conventional manner.

A suitable belt 101 has a running connection with the pulley 97 and with a pulley 102, shown secured to one end of a short countershaft 103 mounted in a suitable bearing bracket 104 comprising a post or upright member 105 having opposed lugs 106 seated upon and secured to a U-shaped member 107 by bolts 108. The U-shaped member 107 is pivotally mounted on spaced lugs 109 by a pivot shaft or rod 110. The lugs 109 are welded or otherwise secured to the axle housing 57. A small sprocket 111 is secured to the opposite end of the countershaft 103 and is shown having a suitable chain 112 operatively connecting it to a relatively larger differential sprocket 113, forming a part of the differential 61. The bearing bracket 104 supports the countershaft 103 in spaced parallel relation to the axle housing 57, as will readily be understood by reference to Figures 3, 6, and 7, whereby the roller chain 112 is maintained under proper tension to provide a driving connection between the countershaft 103 and axle 58.

Because of the pulley 102 being carried directly on the axle housing 57, which is mounted for transverse rocking movement with respect to the cutting unit 10, the spacing between the centers of the pulleys 97 and 102 has a tendency to vary, as a result of the relative up-and-down movement of the pulley 102 which, if permitted beyond a certain extent, may greatly affect the driving connection between the pulleys 97 and 102. To counteract this tendency, the traction drive control linkage, shown in Figure 7 and diagrammatically illustrated in Figure 8, is so arranged as to maintain the lower run of belt 101 substantially uniformly taut, regardless of the transverse rocking movement of the axle housing with respect to the cutting unit, when the traction wheels 59 and 60 are being driven by the belt 101 to propel the mower.

To thus prevent the spacing between the axes of the pulleys 97 and 102 from varying beyond certain limits, the pivot 120 of the bell crank 118, to the leg 117 of which the upper end of the connecting rod 115 is pivotally connected, is located substantially in the pitch line 100 of pulley 97, at the point where the lower run of the belt 101 enters the groove of pulley 97, as diagrammatically illustrated in Figure 8, it being understood that the lower run of the belt is taut, when the belt is rotated in a direction to propel the mower forwardly. The pivot 70 of the opposite end of the link 115 is desirably located adjacent to the bearings 104, as shown in Figure 7.

Referring now to Figure 8, let it be assumed that the countershaft 103 will move along an arc C—C concentric with the axis of the drive shaft 98, as the countershaft pivot 110 is rocked through its limited range 110' and 110" along the arc B—B, which is concentric with the axis A—A of the axle housing 57, shown in Figure 8, and also in Figures 2 and 7.

Since the distance between the countershaft 103 and pivot shaft or rod 110, which is arbitrarily determined by the dimensions of the countershaft bracket 105, is such as to provide clearance between the pulley 102 and tubular bearing member 104, the extreme positions 103' and 103" of countershaft 103 on the arc C—C will be substantially equally distant from the points 110' and 110", respectively. Accordingly, the desired pivotal connection of link 115 with bearing bracket 105 will be adjacent to the bearing 104, as clearly illustrated in Figures 7 and 8 which, as indicated in Figure 8, will move along an arc D—D, concentric with the axis of pivot 120, between the limits indicated at 70' and 70".

Thus, by arranging the pivots 70, 110, and 120 substantially as above stated, the spacing between the axes of pulleys 97 and 102, is maintained substantially constant, regardless of the rocking movement of the axle housing 57, whereby the driving connection between the pulleys 97 and 102 is not affected.

Traction drive control means

The means for controlling the driving connection between the drive pulley 97 and the differential sprocket 112 is best shown in Figure 7, and comprises a toggle mechanism, including a connecting rod 115 having one end pivoted at 70 to the upper portion of the bearing bracket 104. A suitable clevis 116 is secured to the opposite end of the rod 115 and has a pivot 80 connecting it to a leg 117 of a bell crank 118 supported on a pivot 120 mounted at the upper end of a relatively fixed arm or bracket 119, having its lower end suitably secured to the tubular cross member 16 of the cutting unit frame, as by welding. The other leg 121 of the bell crank 118 has one end of a suitable operating rod 122 pivotally connected thereto, as indicated at 130 in Figure 7.

The arm 117 of the bell crank 118 is shown provided with a forwardly extending V-shaped terminal, the tip of which extends below and beyond the fork of the clevis 116, whereby it may engage the clevis and limit further rotation of the bell crank, when the pivot 80 has been moved to an "over center" position, shown in Figure 7, whereby the belt 101 is rendered operative to transmit power from the pulley 97 to the pulley 102. An abutment screw 123 is adjustably mounted in a lug 124 provided on the lower portion of the arm 117 of the bell crank 118. The abutment screw is adapted to engage the bracket or post 129 to limit swinging movement of the bell crank in a direction to release the tension in the belt 101, and also to prevent contact between the pulleys 97 and 102, as will readily be understood by reference to Figure 7. A suitable spring 125 has one end connected to the bearing bracket 105, as, for example, to the cotter pin 126 provided in the offset end of the connecting rod 115. The opposite end of the spring 125 is shown connected to a clip 127 which may be secured to the tubular frame member 16. The spring 125 normally holds the pulley 102 in the dotted line position shown in Figure 7, when the toggle mechanism is positioned to release the tension in the belt 101.

The belt 101 may have a tendency to assume a circular shape, when loosened, and when in such condition, may grip the pulleys with sufficient friction to drive the pulley 102. To prevent such driving of the pulley 102 when the tension in the belt is released, a U-shaped belt guide, generally designated by the numeral 128, is shown having its spaced legs 129 arranged above and below the upper and lower belt runs, as clearly illustrated in Figure 7. The legs 129 prevent the belt runs from bowing outwardly, when the tension therein is released, whereby the belt will not grip the pulleys with sufficient friction to drive the pulley 102. The belt guide 128 may be welded to a bracket 131, shown bolted to the housing of the gear reducer 99 by such means as bolts 132, shown in Figure 3.

The length of the connecting rod 115 is important in that it determines the center to center distance between the pulleys 97 and 102. The length of the connecting rod 115 is so adjusted that when in the full line position shown in Figure 7, the pulleys 97 and 102 will be so spaced apart as to cause the belt 101 to frictionally engage said pulleys with a driving contact, whereby power may be transmitted from the pulley 97 to the pulley 102, through the belt 101. When the pointed terminal of the arm 117 of the bell crank 118 is engaged with the bottom of the clevis 116, the connecting rod 115 is in operative position, the pivot 80 then being in its "over center" position, whereby the rod 115 is locked in its operative position. To release the tension in the belt 101 to interrupt the driving connection between the pulleys 97 and 102, the belt crank 118 is swung to the dotted line position, shown in Figure 7, whereby the bearing bracket 105 supporting the countershaft 103 is swung upwardly, or in a direction towards the drive pulley 97, thereby releasing the tension in the belt.

*Reel drive*

The reel driving mechanism is best shown in Figures 4, 5, and 6, and comprises an extension or a countershaft 133 operatively connected to the drive pulley 97 on the power take-off shaft 98 by a flexible coupling, generally designated by the numeral 134. The flexible coupling is shown comprising a flexible composition disk 135 which is firmly secured to the drive pulley 97 by suitable bolts 136, in concentric relation thereto. The disk 135 is shown spaced outwardly from the adjacent face of the pulley 97 by suitable spacing collars 137, as clearly illustrated in Figure 5. The adjacent end of the countershaft 133 may be secured to the disk 135 by a suitable coupling member, generally designated by the numeral 138, having oppositely disposed arms 139 secured to the disk by bolts 141. The arms 139 are disposed in right angular relation to the bolts 136.

The opposite end of the countershaft 133 is shown supported in a suitable anti-friction bearing 142 mounted in a bearing retainer 143 which is pivotally supported in a yoke 144. The yoke 144 is provided with an elongated bar 145 which is slidably engaged with a fixed arm or bracket 146 welded to or otherwise secured to the end plate 14 of the frame of the cutting unit 10. The arm or bracket 146 is shown having an elongated slot 147 traversed by cap screws or bolts 148 secured to the leg 145 of the yoke 144, and whereby the leg 145 of the yoke is slidably engaged with the bracket or bar 146. The cap screws 148 are secured against turning movement by lock nuts 149 received in threaded engagement therewith.

A suitable pulley 151, preferably of pressed steel, is secured to the outer end of the countershaft 133. A similar pulley 152 is secured to one end of the reel shaft 22, and a belt 153 is engaged with the pulleys 151 and 152 to transmit power from the countershaft 133 to the reel.

*Control means for the reel drive*

To control the operation of the reel drive, means is provided for loosening and tightening the belt 153, power being transmitted from the pulley 151 to the pulley 152 when the belt 153 is taut.

To thus control the tension of the belt 153, a toggle link, generally designated by the numeral 154, is shown having one end connected to the yoke 144 by a pivot 155. The opposite end of the toggle link has a pivot 156 connecting it to a lug 157 suitably secured to a tubular member 158. The member 158 is pivotally supported on lugs 159 and 161 provided respectively on the tubular member 16 of the cutting unit frame and the end plate 14 thereof, as best shown in Figure 6. The toggle link 154, as shown in Figures 4 and 6, comprises two parts, a clevis 162 and an L-shaped rod 163 having one end received in threaded engagement with the clevis 162. By thus constructing the toggle link of two parts, its overall length may be varied to accommodate the length of the belt 153.

A suitable operating arm 164 is secured to the inner end of the tubular member 158 and has one end of a control rod 165 connected thereto, whereby the arm 164 may be conveniently operated, as will subsequently be described. The toggle link 154 is so arranged that when the arm 164 is thrust forwardly from the position shown in Figure 4, to a position whereby the toggle link 154 will be substantially alined with the arm or lug 157, as indicated in dotted lines in Figure 4, the belt 153 will be under tension to transmit power from the pulley 151 to the pulley 152. Such tension is imparted to the belt 153 as a result of the outer end of the countershaft 133 being swung upwardly by sliding movement of the bar 145 of the yoke 144 on the slotted arm 146. When the belt is tensioned for transmitting power to the pulley 152, the countershaft 133 will be substantially axially alined with the power take-off shaft 98, as best illustrated in Figures 3 and 6. When the toggle link 154 is positioned to tension the belt 153, the clevis 162 will be positioned against the parts 145 and 146, which parts are so related to the toggle link that the pivot 156 will be positioned over the center of a line drawn through the axes of the pivots 155 and tubular member 158, whereby the toggle link is locked in belt tightening position. A suitable belt guide 160, similar to the guide 128 in Figure 7, is provided for preventing outward flexing of the runs of the belt 153, the guide 160 may be welded to the arm 145 of the yoke 144.

Controls

As best shown in Figures 1 and 6, the mower is provided with a suitable guiding handle, generally designated by the numeral 166, preferably formed of two steel tubes 167 and 168 having their intermediate portions welded or otherwise secured together to provide an intermediate handle portion 169. The upper portions of the tubes 167 and 168 are bent outwardly to provide handle grip portions 171 and 172, which preferably are right angularly disposed with respect to the handle portion 169. The handle portions 171 and 172 are substantially axially alined with each other, as clearly illustrated in Figure 6.

The lower end portions of the handle tubes 167 and 168 are bent outwardly and downwardly and have flattened terminals 173 and 174, as shown in Figure 6. The handle terminal 173 is pivotally connected to a stud 175 mounted in a lug 176 secured to the axle housing 57, as shown in Figure 6. The other flattened terminal 174 of the handle is pivotally connected to a stud 177, shown secured to the lug 109 located adjacent to the differential sprocket 113. A suitable tie member 177 is interposed between the outwardly directed portions of the lower ends of the tubes 167 and 168 and has its terminals suitably welded or otherwise secured thereto to strengthen and reinforce the handle.

The traction drive control rod 122 has its upper end slidably received in a guide plate 178 secured to the upper portion of the guiding handle, and has a hand grip or knob 179. The control rod 165 for controlling the operation of the cutting reel driving mechanism, has its upper end similarly received in the guide plate 178, but is located at the opposite side of the upper portion of the handle, as shown in Figures 1 and 6. The control rod 165 is also provided with a hand grip or knob 181 to facilitate actuating the rod.

A connecting rod 182 is shown having a bent end portion 183 connected to a plate 184 secured to the motor 90, as illustrated in Figure 1. The opposite end of the rod 182 is received in threaded engagement with a clevis 185 having a pin 186 therein, which is slidably received in a slot 187 provided in an upright flange member 188 secured to the handle portion 169. The connecting rod 182 supports the operating handle 166 in a convenient position for the operator. It also permits limited swinging movement of the operating handle with respect to the mower, as will readily be understood by reference to Figure 1. When the handle is in the full line position shown in Figure 1, the mower may be tilted about the axis of the trailing roller 35, when downward pressure is brought to bear upon the handle 166.

If it is desired to lift the reel and trailing roller 35 out of contact with the ground, the operating handle 166 is swung forwardly until the clevis pin 186 engages the upper end of the slot 187, after which the roller 35 may readily be lifted off the ground. The length of the slot 187 is such that under normal operating conditions, the power and cutting units of the mower may travel over the ground surface without imparting any appreciable amount of swinging movement to the operating handle, whereby the mower may conveniently be guided by the operator. A suitable throttle lever 189 is shown mounted on the handle 171 and has a flexible connection 191 leading therefrom to the usual throttle valve of the engine carburetor, not shown.

Operation

In operation, the traveling movement of the mower is controlled entirely by manipulation of the control rod 122 which, when thrust forwardly will place the belt 101 under tension, and thereby cause the motor or engine 90 to transmit power to the countershaft 133 through the belt 101, whereby power is transmitted to the traction wheels by the chain 113. In like manner, the operation of the reel may be controlled independently of the traction unit by manipulation of the upper control rod 165. The two drive belts 101 and 153 may thus be operated independently of one another, which is highly desirable. Also, because of the universal connection between the cutting unit 10 and power unit 11, said units are free to rock about the axis A—A of the bearing rod 64 and thus follow the contour of the ground independently of one another. If it is deemed desirable to prevent rocking movement of the traction and cutting units, such relative rocking movements may be dispensed with by swinging the arm 83 into operative engagement with the tubular member 78 mounted on the L-shaped rod 74, shown in Figure 9.

The novel mower herein disclosed, has been found very practical and efficient in actual operation. It produces a clean, smooth cut because of the ability of the cutting unit to follow the contour of the ground as a result of its universal pivotal connection with the axle housing 57 of the traction unit. If, as hereinbefore stated, it is found desirable to operate the mower by manual means only, the motor 90 may readily be removed from the structure, in which case the reel would be driven from the traction wheels, through the chain 113, and belts 101 and 153, as will readily be understood. When the mower is to be thus operated without the motor 90, means, not shown, may be provided for supporting the inner end of the countershaft 133, and the control means for the reel drive, shown in Figure 4, may be dispensed with. In other words, when the mower is propelled by the operator manually pushing it along the ground by the operating handle 166, the toggle mechanism, shown in Figure 4, for tightening and loosening the belt 153, may be entirely dispensed with, as the traction drive control means, shown in Figure 7, may be adequate for controlling the driving connection between the traction wheels 59—60 and the cutting reel 21.

In the drawings, I have shown the cutting unit 10 as trailing the traction unit 11. In some instances, however, it may be deemed more desirable to couple the traction unit to the cutting unit rearwardly thereof, in which case the cutting unit would lead the traction unit. In other words, the invention herein disclosed may be applied to mowers of either the push type or pull type, by slightly changing the arrangement of the drives and their respective control means.

It will be apparent to those skilled in the art that I have accomplished at least the principal objects of my invention, and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. In a mower, the combination comprising a grass cutting unit having a ground engaging support at the rear thereof, a frame fixed with respect to the cutting unit and extending a short distance forwardly therefrom, a traction assembly including an axle having wheels thereon, said assembly being positioned ahead of the cutting unit but close thereto, and a pivotal connection between a central part of the forwardly extending frame and a central part of the traction assembly, the axis of said pivotal connection being substantially in the direction of motion of the mower, whereby the traction assembly and mower unit may rock transversely with respect to each other when the mower is progressed over uneven ground.

2. A mower unit of the type set forth in claim 1 further characterized in that the ground engaging support at the rear thereof and the pivotal connection between the traction assembly and forwardly extending frame each are vertically adjustable through substantially equivalent ranges whereby the cutting unit may be moved throughout a range of level positions and the depth of cut varied.

3. A mower unit of the type set forth in claim 1 further characterized in that it includes an adjustable movement limiting linkage interconnecting the traction assembly and the forwardly extending frame for limiting the transverse rocking movement of the traction assembly.

4. A mower unit of the type set forth in claim 1 further characterized in that it includes an adjustable movement limiting linkage interconnecting the traction assembly and forwardly extending frame for limiting the transverse rocking movement of the traction assembly and a manually operable lock interconnecting the traction assembly and frame for holding them substantially immovable with respect to each other.

5. A mower comprising a grass cutting unit having a ground engaging support at the rear thereof, a frame fixed with respect to the cutting unit and extending a short distance forwardly therefrom, a traction assembly comprising an axle having wheels thereon positioned ahead of the cutting unit but close thereto, a pivotal connection between a central part of the forwardly extending frame and a central part of the traction assembly the axis of said pivotal connection being substantially in the direction of motion of the mower, a motor fixedly mounted on the forwardly extending frame above the traction assembly and power transmission means connecting the motor and cutting units and the motor and traction wheels.

6. A mower of the type described in claim 5 further characterized in that the power transmission means connecting the motor and traction assembly comprises a counter-shaft frame having a counter-shaft thereon, said frame being mounted on the traction assembly for movement of the counter-shaft parallel to the axle of the traction assembly, said counter-shaft frame also being movable throughout a range of positions toward and away from the motor, a pulley on the motor and a pulley on the counter-shaft, a belt over said pulleys, and means interconnecting the cutting unit and counter-shaft frame for moving the counter-shaft frame with reference to the traction assembly to maintain said belt sufficiently tight to transmit power as the traction assembly rocks transversely with respect to the forwardly extending frame.

7. A mower of the type described in claim 5 further characterized in that the power transmission means connecting the motor and traction assembly comprises a counter-shaft frame having a counter-shaft thereon, said frame being mounted on the traction assembly for movement of the counter-shaft parallel to the axle of the traction assembly, said counter-shaft frame also being movable throughout a range of positions toward and away from the motor, a pulley on the motor and a pulley on the counter-shaft, a belt over said pulleys, means interconnecting the cutting unit and counter-shaft frame for moving the counter-shaft frame with reference to the traction assembly to maintain said belt sufficiently tight to transmit power as the traction assembly rocks transversely with respect to the forwardly extending frame, and manual means for moving the counter-shaft frame towards the motor pulley in an amount sufficient to loosen the belt thereby to interrupt transmission of power from the motor to the wheels of the traction assembly.

8. A mower of the type set forth in claim 5 further characterized in that the power transmission means connecting the motor and the cutting unit comprises a shaft connected to the motor shaft thru a universal joint, a pulley on said shaft, at a point removed from the motor, a pulley on the cutting unit located in alignment with the pulley on the shaft, a belt running over said pulleys, and bracket means supporting the shaft near the pulley thereon, said bracket being manually movable from a normal position in which the shaft is held substantially aligned with the motor shaft and in which position the belt is tight and operative to transmit power to a position in which the shaft pulley is displaced out of line with the motor shaft toward the cutting unit pulley, in which position the belt is loosened and is inoperative to transmit power.

9. A mower comprising a grass cutting unit having a ground engaging support at the rear thereof, a frame fixed with respect to the cutting unit and extending a short distance forwardly therefrom, a traction assembly including an axle having wheels thereon positioned ahead of the cutting unit but close thereto, a pivotal connection between a central part of the forwardly extending frame and a central part of the traction assembly the axis of said pivotal connection being substantially in the direction of motion of the mower, whereby the traction assembly and mower unit may rock transversely with respect to each other when the mower is progressed over uneven ground, a means mounted on the mower for propelling and guiding the same, a counter-shaft mounted on the forwardly extending frame and power transmitting connections between the cutting unit and the countershaft and between the axle of the traction assembly and the counter-shaft.

RALPH W. SPEISER.